US010963333B1

(12) United States Patent
Nijim et al.

(10) Patent No.: US 10,963,333 B1
(45) Date of Patent: Mar. 30, 2021

(54) TELEMATICS-BASED NETWORK DEVICE TROUBLESHOOTING AND REPAIR

(71) Applicant: Cox Communications, Inc., Atlanta, GA (US)

(72) Inventors: Yousef Wasef Nijim, Cumming, GA (US); James Alan Strothmann, Johns Creek, GA (US)

(73) Assignee: Cox Communications, Inc., Atlanta, GA (US)

( * ) Notice: Subject to any disclaimer, the term of this patent is extended or adjusted under 35 U.S.C. 154(b) by 126 days.

(21) Appl. No.: 16/106,195

(22) Filed: Aug. 21, 2018

(51) Int. Cl.
 *G06F 11/07* (2006.01)
 *G06N 20/00* (2019.01)

(52) U.S. Cl.
 CPC ........ *G06F 11/0793* (2013.01); *G06F 11/079* (2013.01); *G06F 11/0709* (2013.01); *G06F 11/0787* (2013.01); *G06N 20/00* (2019.01)

(58) Field of Classification Search
 CPC combination set(s) only.
 See application file for complete search history.

(56) References Cited

U.S. PATENT DOCUMENTS

| | | | |
|---|---|---|---|
| 4,937,825 A * | 6/1990 | Ballard | H04L 43/065 709/224 |
| 7,620,848 B1 | 11/2009 | Tanner | |
| 8,327,408 B2 | 12/2012 | Savoor et al. | |
| 8,340,923 B2 * | 12/2012 | Wood | G06F 11/008 702/34 |
| 8,356,207 B2 * | 1/2013 | Hosek | G05B 23/0235 714/26 |
| 8,365,019 B2 * | 1/2013 | Sailer | G06F 11/079 714/26 |
| 8,738,973 B1 * | 5/2014 | Vannatter | G06Q 10/00 714/47.1 |
| 8,826,314 B2 * | 9/2014 | Wang | H04L 65/80 375/240.12 |
| 8,938,749 B2 * | 1/2015 | Yang | H04H 60/32 725/14 |

(Continued)

FOREIGN PATENT DOCUMENTS

WO    2015/188490 A1    12/2015

*Primary Examiner* — Amine Riad
(74) *Attorney, Agent, or Firm* — Merchant & Gould P.C.

(57) ABSTRACT

Telematics-based device troubleshooting, self-repair, and optimization are provided. A system, method, and computer readable storage device collect telemetry data associated with the health of networked CPE devices, service provider data, and service and repair data associated with CPE devices, analyze the collected information, and detect and predict issues that can affect the functioning and operation of CPE devices. Analysis of collected data can be based on self-check rules. In some implementations, troubleshooting steps or rules can be executed by a server device or communicated to a CPE device for enabling self-troubleshooting and self-correction of an issue. Self-check and troubleshooting rules can be configured according to insights derived from machine learning techniques applied to collected data (e.g., telemetry data, service provider data, and service and repair data (troubleshooting and repair feedback data collected in association with customer calls, field technician visits, and self-healing checks and actions performed on/by CPE devices)).

20 Claims, 8 Drawing Sheets

(56) References Cited

U.S. PATENT DOCUMENTS

| | | | | |
|---|---|---|---|---|
| 9,092,802 B1* | 7/2015 | Akella | ................... | G06N 7/005 |
| 9,449,278 B2* | 9/2016 | Davlos | .................... | G06N 5/04 |
| 9,459,976 B1 | 10/2016 | Sun | | |
| 9,647,906 B2* | 5/2017 | Asenjo | ................ | H04L 43/0817 |
| 9,720,758 B2* | 8/2017 | Jacoby | ................ | G06F 11/3058 |
| 2005/0278575 A1* | 12/2005 | Nicholson | ............. | G06F 11/008 |
| | | | | 714/37 |
| 2009/0063387 A1* | 3/2009 | Beaty | ....................... | G06N 5/04 |
| | | | | 706/50 |
| 2012/0221125 A1* | 8/2012 | Bell | ........................ | B29C 70/10 |
| | | | | 700/32 |
| 2014/0019092 A1* | 1/2014 | Phelps | ............... | G05B 23/0245 |
| | | | | 702/185 |
| 2014/0336791 A1* | 11/2014 | Asenjo | .................. | G06Q 10/06 |
| | | | | 700/44 |
| 2015/0007173 A1* | 1/2015 | Ionescu | .............. | G06F 9/45533 |
| | | | | 718/1 |
| 2015/0348051 A1* | 12/2015 | Bodda | .................. | G06Q 30/016 |
| | | | | 705/304 |
| 2016/0255342 A1 | 9/2016 | Blair et al. | | |
| 2017/0250855 A1* | 8/2017 | Patil | ..................... | H04L 41/064 |
| 2018/0307759 A1* | 10/2018 | Raghavan | ............. | G06F 16/27 |
| 2019/0339688 A1* | 11/2019 | Cella | ................... | G06K 9/6263 |

\* cited by examiner

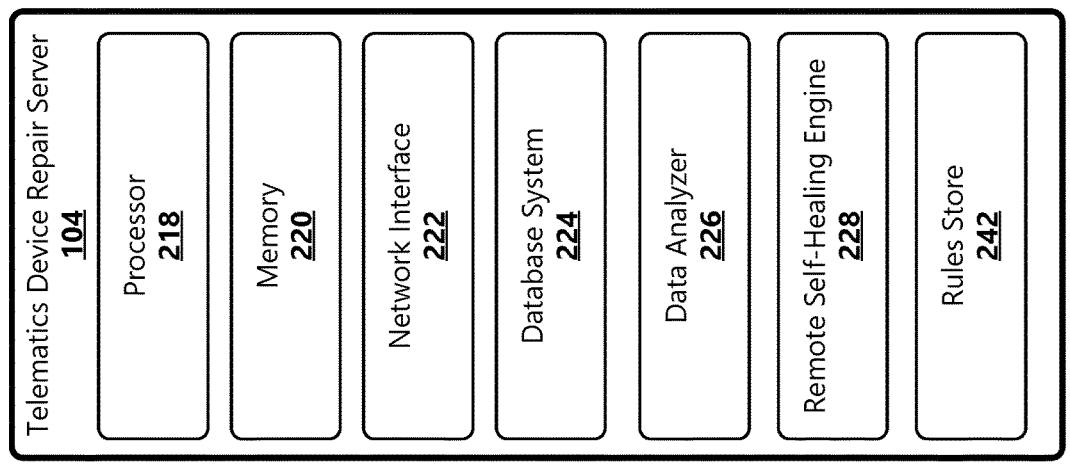
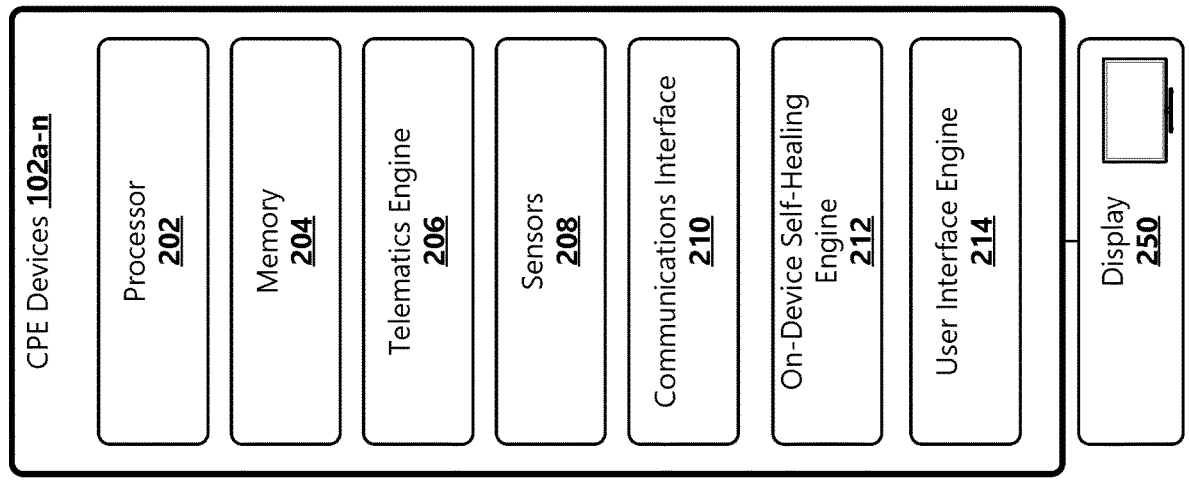
FIG. 2

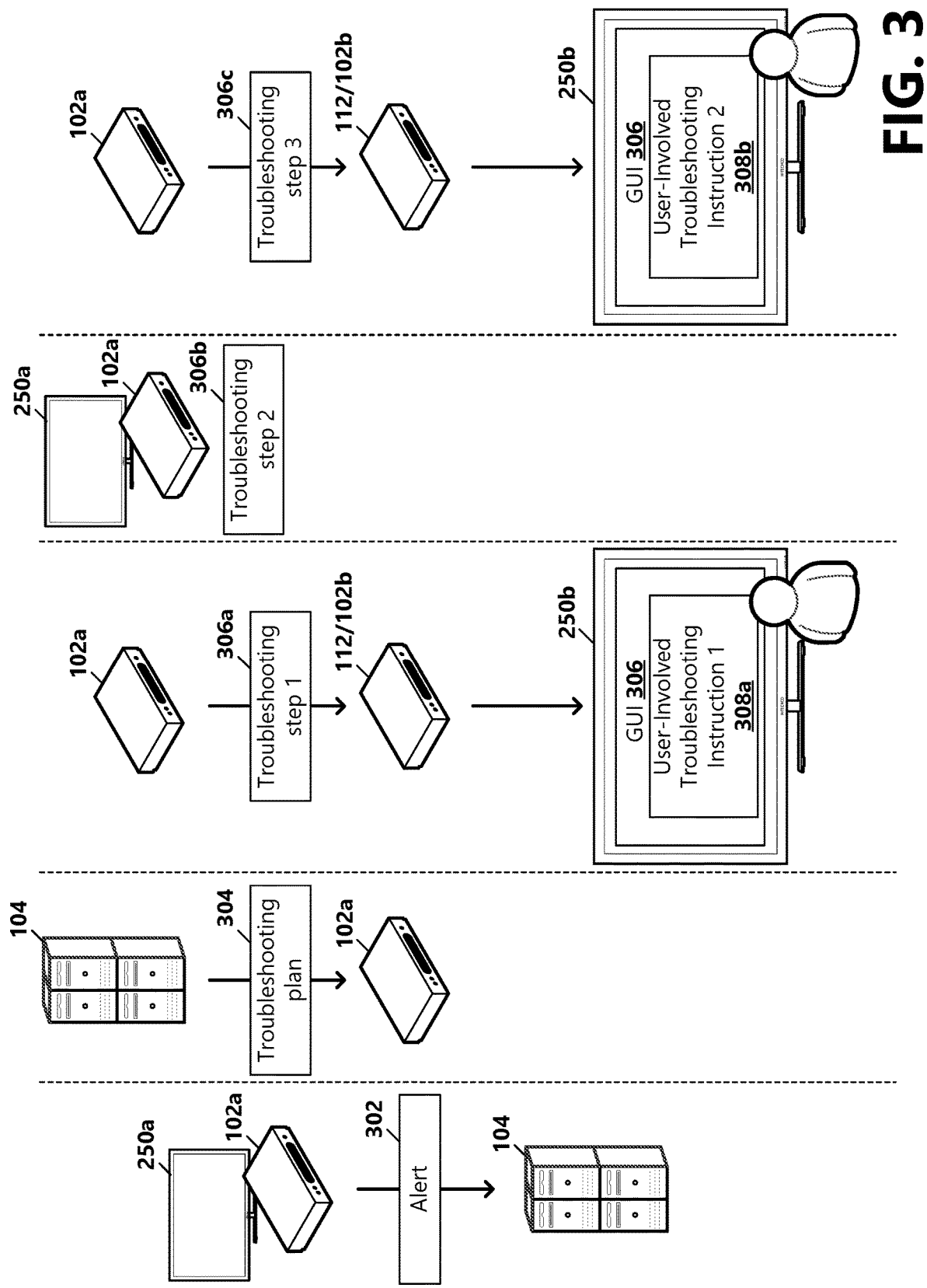

TELEMATICS-BASED NETWORK DEVICE TROUBLESHOOTING AND REPAIR

BACKGROUND

Users of customer premises equipment (CPE) devices (e.g., cable or satellite television set-top box (STB), digital subscriber line (DSL) or other broadband Internet router, voice over Internet protocol (VoIP) base station, telephone handset, streaming media player, or other customized hardware used by a particular telecommunications or media service provider) expect their devices to operate reliably. However, users may experience problem issues with their CPE devices due to a wide variety of reasons from hardware or software issues to loose connections. When a CPE device experiences an issue and is not functioning properly, the CPE device can operate inefficiently, can experience downtime, and/or services provided via the CPE device can be interrupted or otherwise negatively affected. As can be appreciated, this can not only negatively impact resource productivity, but can also negatively affect quality of service and customer satisfaction.

Further, typically when a user experiences a problem issue with a CPE device, the user may contact or "call" the provider of the CPE device to resolve the issue. In some cases, a customer service agent, technical support person, or on-call "expert" may take the "call," obtain information from the user about the issue the user is experiencing with the CPE device, and may suggest various troubleshooting instructions to the user. In some cases, when an issue is detected or when a CPE device fails, a dispatch or "truck roll" is required to attempt to repair the device or to replace the device and restore service to the user. Not only can this be frustrating to the user, but the cost of truck rolls and the cost of replacing failed devices be significant expenses for the provider.

SUMMARY

Aspects of the present disclosure provide a technical improvement to the functionality and performance of customer premises equipment (CPE) devices connected to a telematics device repair server via a network by providing telematics-based device troubleshooting, self-repair, and optimization. A system, method, and computer readable storage device are provided that collect telemetry data associated with the health of networked CPE devices, service provider data, and service and repair data associated with CPE devices, analyze the collected information, and detect issues that can affect the functioning and operation of one or more CPE devices. For example, aspects provide for evaluating the communal health of CPE devices, which can be used to identify issues, diagnose issues, and predict issues. Analysis of collected data can be based on one or more self-check rules that, in various implementations, are configured according to insights derived from machine learning techniques applied to collected telemetry data, service provider data, and service and repair data of CPE devices.

The system, method, and computer readable storage device further provide for troubleshooting and self-correcting an identified issue based on a troubleshooting plan comprised of one or more troubleshooting steps or rules that, in various implementations, are configured according to insights derived from machine learning techniques applied to collected telemetry data, service provider data, and service and repair data (e.g., troubleshooting and repair feedback data collected in association with customer calls, field technician visits, and self-healing checks and actions performed on/by CPE devices). In various examples, troubleshooting steps or rules can be executed by a server device or communicated to a CPE device for enabling the CPE device to troubleshoot and self-correct an issue. In various examples, user-involved troubleshooting steps can be communicated to a CPE device or to another device for presentation to a user.

When an issue cannot be self-corrected, troubleshooting and repair feedback can be generated that includes telemetry data, troubleshooting information, results, and other relevant data. This troubleshooting and repair feedback can be provided to a field technician for enabling the technician to fix the issue efficiently and minimize the technician's time and the customer's premises.

In various implementations, the system, method, and computer readable storage device further provide for predicting issues with one or more CPE devices before customer calls based on identified issues with other CPE devices, and automatically self-correcting issues if possible. Predictions can be based on identified attributes of a particular issue (e.g., based on a learned data pattern) and an identification of similar attributes with a CPE device (e.g., telemetry data values, CPE device type, a particular service, a certain network, a certain location, a certain node, a certain software version, certain applications, certain hardware components; certain device configurations).

By collecting and analyzing data in association with various CPE devices, insights can be derived for understanding issues, such that issues that may affect the functioning and reliability of CPE devices can be automatically identified and diagnosed. Accordingly, the quality, operation, and performance of the CPE devices and related services are improved. The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIG. 2 is a block diagram of components of an example embodiment of a telematics device repair system for providing telematics-based device troubleshooting, self-repair, and optimization according to an embodiment;

FIG. 3 is a block diagram illustrating an example sequence of communications between CPE devices and the TDR server as part of troubleshooting a CPE device;

DETAILED DESCRIPTION

Figure 1:
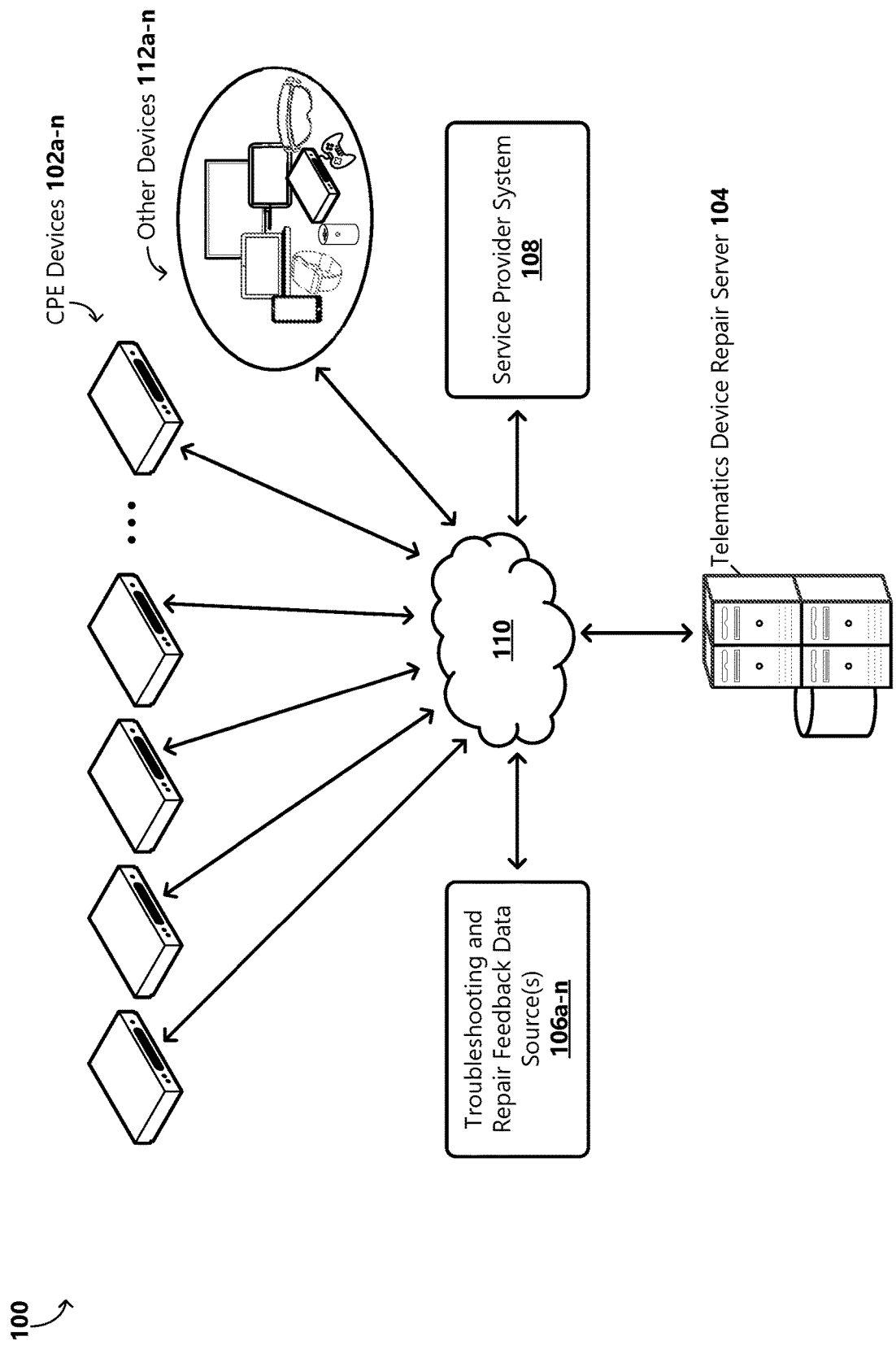
FIG. 1 is a block diagram of an example environment in which a system of the present disclosure can be implemented.

Aspects of the present disclosure enable an improvement of the performance of computing devices connected to a network by providing telematics-based device troubleshooting, self-repair, and optimization. FIG. 1 is a block diagram of an example operating environment 100 in which the present disclosure can be practiced. As shown in FIG. 1, a telematics device repair (TDR) server 104 is in communication with a plurality of customer premises equipment (CPE) devices 102a-n (collectively or individually referred to as CPE device 102) via a network 110 or a combination of networks. According to an aspect, a CPE device 102 is illustrative of a telecommunications or media hardware device located at a home, business, or other customer location. Example CPE devices 102 can include cable or satellite television set-top boxes (STB), digital subscriber line (DSL) or other broadband Internet routers, voice over Internet protocol (VoIP) base stations, telephone handsets, streaming media players, or other customized hardware used by a particular telecommunications or media service provider. Many different types of CPE devices 102 are available in the marketplace. According to an aspect, a CPE device 102 includes functionality to receive content transmitted from a service provider system 108 and to descramble and/or decipher that content for consumption by a user. As should be appreciated, other types of CPE devices 102 are possible and are within the scope of the present disclosure.

According to an aspect of the present disclosure, a CPE device 102 includes functionality to collect telemetry data associated with the performance and behavior of the CPE device. In some examples, the CPE device 102 further includes functionality to analyze one or more collected telemetry data values for assessing the health of the CPE device, for example, for identifying an issue (e.g., network or connectivity issue, overheating, grounding, software) associated with the CPE device. In some examples, the CPE device 102 further includes functionality to diagnose an identified issue. In some examples, the CPE device 102 further includes functionality to communicate with other CPE devices 102 (e.g., other CPE devices within the user premises and/or other CPE devices on a same node (with user permissions)) for identifying and/or diagnosing an issue associated with the CPE device. Issue identification and/or issue diagnostics can be performed based on a set of rules. For example, self-check rules may be used for automatic analysis of CPE device and system health and for identifying issues and troubleshooting rules can be used for diagnosing an issue.

In some implementations, the CPE device 102 further includes functionality to automatically troubleshoot an identified issue for diagnosing and self-resolving the issue. In other examples, the CPE device 102 includes functionality to transmit collected telemetry data and metadata to the TDR server 104, wherein the TDR server includes functionality to perform one or a combination of: remotely identifying an issue associated with the CPE device based at least in part on the received data, determine or generate a troubleshooting plan for diagnosing and resolving the identified issue based on the identified issue and collected telemetry data, wherein generation of the troubleshooting plan is based on machine-learned insights, executing one or more troubleshooting steps of the plan (e.g., executing one or more troubleshooting rules based on the troubleshooting plan), and providing instructions to the CPE device for enabling the CPE device to execute one or more troubleshooting steps of the troubleshooting plan for enabling the CPE to self-heal.

In various examples, the CPE device 102 includes functionality to receive one or more troubleshooting steps from the TDR server 104, to evaluate the one or more troubleshooting rules, and to perform one or more actions based on the steps or based on an evaluation of the rules. According to an aspect, the one or more actions can include actions associated with enabling the CPE device 102 to diagnose, troubleshoot, and repair an identified issue, notifying a user about the identified issue, instructing the user to perform troubleshooting and repair steps, providing additional data to the TDR server 104, etc.

The TDR server 104 can be comprised of one or a plurality of server computing devices. According to various aspects and as will be described in further detail below, the TDR server 104 is operative to communicate with CPE devices 102 for collecting telemetry data. According to an example, telemetry data in can include information about the CPE devices, such as information relating to how the devices are configured, performance of the devices, behavior of the devices, and health and quality-related information. The collected data can be stored and analyzed by the TDR server 104 for identifying issues that may affect the functioning, behavior, or operation of one or more CPE devices 102. In some implementations, the identification of issues can be performed proactively (e.g., identifying an issue before the issue is experienced but is determined to be likely to occur based on collected data, identifying an issue prior to being notified by a user, or identifying an issue prior to detection by a user). In other implementations, an issue can be identified in real-time or near-real time.

In some examples, collected data can be analyzed by the TDR server 104 for diagnosing identified issues. For example, the TDR server 104 includes functionality to ascertain the cause or nature of a particular issue (e.g., disorder, malfunction, or problem) from one or more symptoms experienced on one or more CPE devices 102, wherein the one or more symptoms may be characterized in the collected telemetry data. In some examples, diagnosis of an issue can entail performing one or more troubleshooting steps. According to some aspects, the TDR server 104 is further operative to learn or determine a troubleshooting plan comprised of one or more troubleshooting steps or rules for diagnosing, resolving, or repairing an identified issue and to communicate with CPE devices 102 for providing troubleshooting instructions to the CPE devices. In some examples, the TDR server 104 is operative or configured to correct network settings via a control system to correct an identified issue.

In some implementations, the TDR server 104 provides troubleshooting instructions to one or more CPE devices 102 responsive to receiving an alert from the CPE device, wherein the alert indicates an issue identified by the CPE device. The alert may include or may be accompanied by telemetry data associated with the issue, metadata, and other data about the CPE device 102. Metadata can include a variety of information, such as information about the CPE device (e.g., device type, identifying information, location data, date and time data, applications installed or running on the device, software version information, device configuration). An example troubleshooting rule may include an evaluation of a current software version and an action to update the software or to fall back to a previous version (e.g., if issues are identified with a current version). In some examples, some troubleshooting steps may entail user involvement. Accordingly, user-involved troubleshooting steps can be communicated to a CPE device 102 or another device 112 for presentation to a user.

The TDR server 104 and, in some implementations, the CPE device 102 are operative to communicate with other devices 112a-n (e.g., another CPE device, a mobile phone, a tablet computing device, a laptop computing device, a desktop computing device, a wearable device, a smart speaker device, or a gaming device) for collecting telemetry data, providing troubleshooting instructions, providing other information to users, and/or for receiving information (e.g., observed symptoms, troubleshooting results, questions, other information) from users. Details of computing devices and variations thereof that can be implemented as another device 112 can be found in FIGS. 5, 6A, and 6B. In some examples, a user interface (UI) is provided for displaying information to the user and for receiving information from the user. For example, the UI can include a guide UI, a chat or messaging UI, or other type of UI. In some examples, such as when another device 112 is embodied as a smart speaker device, information can be provided and received audibly via a speaker.

The TDR server 104 can be implemented as a single computing device or as a plurality of computing devices cooperating in a distributed environment. For example, the TDR server 104 can be provided via multiple computing devices arranged in a distributed environment that collectively provide various functionalities described herein. Details of computing devices and variations thereof can be found in FIGS. 5, 6A, and 6B. The network 110 can encompass a variety of network types including, but not limited to, the Internet, an intranet, an extranet, local-area networks, wide-area networks, fiber-coax networks, public switched telephone networks, global telephone networks, etc., and combinations thereof. An example cable television (CATV) architecture that can serve as one example of a network 110 via which aspects of the disclosure can operate is illustrated in FIG. 7 and is described below.

According to some aspects and as will be described in further detail below, the TDR server 104 is operative to communicate with one or more troubleshooting and repair feedback data sources 106a-n (collectively or individually referred to as troubleshooting and repair feedback data source 106). A troubleshooting and repair feedback data source 106 is illustrative of a data source configured to provide, to the TDR server 104, troubleshooting and repair feedback data, which can include data relating to a service, repair, or troubleshooting steps performed to a CPE device 102 or within the system to repair (or attempt to repair) the CPE device or resolve (or attempt to resolve) an identified issue. For example, troubleshooting and repair feedback data can include information relating to an identified issue, diagnostics, troubleshooting procedures, troubleshooting rule evaluation results, and repairs associated with a CPE device 102. Troubleshooting and repair feedback data can further include metadata. Metadata can include a variety of information, such as information about the CPE device (e.g., device type, identifying information, location data, time and date data, applications installed or running on the device, software version information, device configuration).

Troubleshooting and repair feedback data sources 106 can be embodied as various types of devices, applications, services, or data stores. For example, a data entry component of a UI that receives user input (e.g., service technician input, technical support input), a CPE device 102, another device 112, a database, etc., can operate as a troubleshooting and repair feedback data source 106 to the TDR server 104. As an example, when an issue occurs with a CPE device 102, the CPE device may identify the issue and self-correct the issue (as will be described below) or the customer/user may make a call to a call technical support person regarding the issue. Self-correction can include an evaluation of one or more troubleshooting rules and performance of one or more actions based on the evaluation results to resolve or self-correct the issue. Data about the CPE device, the issue, troubleshooting rules evaluated, results of the evaluation(s), troubleshooting procedures performed, repairs made, or other findings (i.e., troubleshooting and repair feedback data) can be communicated to the TDR server 104.

Responsive to a technical support call, various troubleshooting steps or procedures may be performed remotely or locally, or the CPE device may be removed from the customer premises and be repaired or inspected off-location (e.g., by the service provider, by the manufacturer, or by a third-party repair technician). Data about with the CPE device, the issue, troubleshooting rules evaluated, results of the evaluation(s), troubleshooting procedures performed, repairs made, or other findings can be manually entered into an interface on a device (e.g., by a technician) and communicated to the TDR server 104 or automatically communicated (e.g., by the CPE device 102) to the TDR server. According to an aspect, the TDR server 104 is operative to collect troubleshooting and repair feedback data from various troubleshooting and repair feedback data sources 106 and to store the collected data in a database system where data analytics can be performed for deriving insights for identifying issues and for learning optimal troubleshooting plans. These learned insights for identifying issues and learned optimal troubleshooting plans can be utilized by the TDR system for enabling self-correction of issues, which provides a technical improvement to the functionality and performance of CPE devices 102. Implementation of learned insights can additionally improve the efficiency of service provider systems 108 providing services to CPE devices 102 and can further reduce downtime and resources dedicated to technician calls/visits.

As illustrated, the TDR server 104 is in communication with a service provider system 108. In some implementations, the TDR server 104 is integrated with the service provider system 108. In other implementations, the TDR server 104 is separate from the service provider system 108, but is configured to communicate with the service provider system for receiving and providing information associated with enabling telematics-based device troubleshooting, self-repair, and optimization. For example, the service provider system 108 can provide information about signal levels of transmissions from the server provider system headend, bandwidth levels, software update-related information, available services, customer subscription information, business rules, etc.

With reference now to FIG. 2, a block diagram illustrating components of an example embodiment of a TDR system 200 is provided. As illustrated in FIG. 2, the example embodiment of the TDR system 200 includes a plurality of CPE devices 102a-n, a TDR server 104, at least one troubleshooting and repair feedback data source 106 and a service provider system 108. A CPE device 102 of an embodiment includes at least one processor 202, memory 204, a telematics engine 206, sensors 208, a communications interface 210, an on-device self-healing engine 212, and a user interface (UI) engine 214. The TDR server 104 of an embodiment includes at least one processor 218, memory 220, a network interface 222, a database system 224, a data analyzer 226, a remote self-healing engine 228, and a rules store 242. The troubleshooting and repair feedback data source 106 of an embodiment includes at least one processor 230, memory 232, and a network interface 234. The service provider system 108 of an embodiment includes at least one processor 236, memory 238, and a network interface 240.

With reference to the CPE device 102, the memory 204 includes one or more computer-readable storage media capable of storing data and/or computer-executable instructions. The memory 204 may store the computer-executable instructions that, when executed by the at least one processor 202, cause the telematics engine 206, illustrative of a software module, system, or device, to collect telemetry data. In various embodiments, the memory 204 is implemented in various ways. According to an aspect, telemetry data includes information about the CPE device 102, how the device is configured, performance of the device, the operating environment of the device, and health and quality-related information, such as information about a network 110 or connectivity to a network, signal levels, information about the functioning of hardware components, information about the functioning of software components, application signaling information, etc. In various examples, telemetry data includes sensor data. Sensor data can include data sensed by various sensors 208 included in or communicatively attached to the CPE device 102. For example, sensors 208 can include sensors operative to measure various attributes, such as temperature, voltage, fan speed, signal status (e.g., signal strength, signal quality), etc.

The telemetry data collected at a CPE device 102 can include a variety of unstructured data, which can be persisted in a temporary data store (memory 204) at the CPE device 102 as unstructured data. In some implementations, various sensors integrated in the system can send telemetry data directly to the TDR server 104 via one or a combination of networks 110. In other implementations, telemetry data can be collected by the telematics engine 206 and then sent to the TDR server 104. In some examples, the telematics engine 206 includes functionality to structure or semi-structure unstructured telemetry data (e.g., based on a schema). In some examples, the telematics engine 206 includes functionality to filter and process collected telemetry data. For example, the telematics engine 206 can remove certain telemetry, add properties to the telemetry data, etc. Structured, semi-structured, or processed telemetry data can be stored locally at the CPE device 102 and/or can be transmitted to the TDR server 104.

Telemetry data may be collected in various manners, such as: continually, for example, at predetermined time intervals; collected after a software update; collected upon initiation of and/or during use of particular services operating on the CPE device 102; collected responsive to a request transmitted from the TDR server 104 or from another CPE device 102; etc. In various implementations, the memory 204 may store computer-executable instructions that, when executed by the at least one processor 202, cause the communications interface 210, illustrative of a software module, system, or device, to transmit telemetry data and metadata to the TDR server 104. For example, collected telemetry data and metadata can be transmitted to the TDR server 104, where the telemetry data, metadata, and other collected data (e.g., troubleshooting and repair feedback data, service provider data) can be analyzed using advanced analytics techniques such as text analytics, machine learning, predictive analytics, data mining, statistics, and natural language processing. For example, analysis of collected data enables the TDR server 104 to gain insights about issues associated with CPE devices 102. These insights can be used to improve the accuracy and efficiency of identifying issues, diagnosing issues, troubleshooting issues, correcting issues, predicting issues, and preventing issues.

In some implementations, the CPE device 102 is configured to perform a self-check and locally identify an issue based on collected telemetry data. For example, the memory 204 may store computer-executable instructions that, when executed by the at least one processor 202, cause the on-device self-healing engine 212, illustrative of a software module, system, or device, to apply one or more self-check rules to collected telemetry data for identifying an issue associated with the CPE device. The on-device self-healing engine 212 can evaluate collected telemetry data based a configurable set of rules, sometimes referred to herein as self-check rules, for automatically analyzing system health and for identifying an issue with the CPE device 102. In some examples, the on-device self-healing engine 212 stores the self-check rules locally, such as in memory 204 or in a local rules store.

As an example, the on-device self-healing engine 212 may be configured to evaluate a plurality of self-check rules for analyzing certain telemetry data points and for creating an alert when certain telemetry values meet a certain criterion or meet or exceed a certain threshold. For example, a telemetry data point that meets a certain criterion or that meets or exceeds a certain threshold can be indicative of an issue (e.g., failure of a CPE device 102 component, a software issue, a failure upstream of the CPE device, performance degradation, loss of CPE device functionality). The self-check rules, criteria, predetermined thresholds, and predefined operating parameters may be configured at and/or determined by the TDR server 104 (e.g., based on known or observed data patterns, based on learned insights) and communicated to the on-device self-healing engine 212. In some examples, self-check rules, predetermined thresholds, criteria, and predefined operating parameters can be based on an identified issue occurring with one or more other CPE devices 102. For example, the TDR server 104 includes functionality for configuring a set of self-check rules based on an identified data pattern discovered via machine learning techniques.

In various implementations, the on-device self-healing engine 212 is further operative or configured to perform certain actions based on an evaluation of a corresponding self-check rule. For example, the memory 204 may store the computer-executable instructions that, when executed by the at least one processor 202, cause the on-device self-healing engine 212 to determine whether an identified issue can be troubleshot and/or repaired locally, and if so, to perform certain troubleshooting and/or repair actions based on the identified issue. According to an aspect, the troubleshooting and repair actions are part of an optimal troubleshooting plan determined by the TDR server 104 for diagnosing and resolving an issue. The troubleshooting plan can be configured at the TDR server 104 based on analysis of collected data (e.g., telemetry data, troubleshooting and repair feedback data, service provider data), and can be provided to and, in some examples, stored locally on the CPE device 102.

In some implementations, telemetry data and associated metadata are transmitted from the CPE device 102 to the TDR server 104 responsive to an issue being self-identified by the CPE device. As an example, the telematics engine 206 may communicate with various components of a CPE device 102 including, for example, an HDMI (High-Definition Multimedia Interface) port component. Telemetry data collected from the HDMI component can include a signal level reading (e.g., voltage, amperage), wherein the signal level reading may be a measurement of the communication signal received by the HDMI component or can be a measurement of a communication signal output by the HDMI component. A low or nil signal measurement value can be identified as an issue associated with the HDMI component (according to an evaluation of one or more self-check rules). Responsive to the evaluation, the on-device self-healing engine 212 can generate an event indicating the issue, which can be communicated to the TDR server 104 as an alert and can include associated telemetry data and metadata. In some examples, the communications interface 210 transmits telemetry data and alerts via an in-band data channel. In other examples, the communications interface 210 transmits telemetry data and alerts via an out-of-band (OOB) data link. In some implementations, the communications interface 210 is operative to provide one or a plurality of APIs (Application Programming Interfaces) that enable the CPE device 102 to send telemetry data to the TDR server 104 and to receive information from the TDR server. According to an aspect, the communications interface 210 is operative to communicate with the TDR server 104 via various data transport mechanisms and using various communication protocols.

In various implementations, the CPE device 102 includes functionality to communicate with other CPE devices 102, for example, to gather additional telemetry data and/or to request statuses of other CPE devices for identifying issues. In some examples, the other CPE devices 102 with which the CPE device 102 is in communication can include one or more other CPE devices in the user's premises. For example, if the CPE device 102 is a CATV set-top box, the user may have additional CATV set-top boxes in his/her home with which the CPE device is configured to communicate. In some examples, other CPE devices 102 include one or more other CPE devices on a same node. For example, a CPE device 102 embodied as a CATV set-top box in the user's home may identify an issue. The CPE device 102, via the communications interface 210, may send a message to other CPE devices in the user's home and/or to other CPE devices on a same node requesting the status of a component, service, or operating condition that is associated with the detected issue with the CPE device 102. Responsive to receiving the message, the other CPE devices may be configured to respond with an acknowledgement indicating whether it is experiencing the same issue (e.g., an indication of whether an issue is confined to the CPE device 102 or is affected other devices).

According to an example, a CPE device 102 may reboot a plurality of times within a time period. Telemetry data indicative of the reboots can be communicated to the telematics engine 206. For example, the telematics engine 206 may collect telemetry data, such as various measurements, readings, performance and component status information, and/or operating condition information. In one example, the telematics engine 206 may query an event log stored in memory 204 (e.g., in a system log) for events (e.g., all events, events of a certain type) that have occurred (e.g., since a last query). In some implementations, the telematics engine 206 is configured to report all collected telemetry data to the TDR server 104.

In other implementations, the CPE device 102 is configured to identify issues locally and to report identified issues and associated telemetry data to the TDR server 104. For example, the on-device self-healing engine 212 may include functionality to evaluate one or more self-check rules for determining whether a certain event type (e.g., an event associated with the event log service shutting down) has occurred and if so, whether the number of occurrences of the event type meets or exceeds a predetermined threshold indicative of an issue. An example self-check rule may include an evaluation of whether other CPE devices that the CPE device 102 may be in communication with are experiencing the same issue. For example, the CPE device 102 may send a message to other CPE devices in the user's home and/or other CPE devices on the same node requesting an acknowledgement of whether the same event has occurred on the other CPE devices (e.g., whether the event logs of the other CPE devices include records of the event associated with the event log service shutting down). If other CPE devices 102 in the user's home and other CPE devices on the same node acknowledge that the same or similar behavior (e.g., same or similar occurrence of events), the issue may be determined to be an environmental issue (e.g., power failure affecting the user's home, power failure affecting a region) rather than a CPE device-specific issue. Alternatively, if the other CPE devices do not acknowledge that the same event has occurred, it can indicate an issue with the specific CPE device 102, such as a loose or malfunctioning power connection, which the CPE device can communicate to the TDR server 104 via an alert.

According to an aspect, the TDR server 104 is configured to receive telemetry data, metadata, and/or alerts from a plurality of CPE devices 102 via the network interface 222. For example, the network interface 222 enables the TDR server 104 to receive data from and send data to CPE devices 102 via one or a combination of networks 110. In various examples, the network interface 222 communicates with CPE devices 102 via an API. The TDR server 104 is further configured to receive troubleshooting and repair feedback data from one or more troubleshooting and repair feedback data sources 106. For example, a troubleshooting and repair feedback data source 106 is configured with a network interface 234 that enables the data source to pass messages to the TDR server 104 to provide information relating to issues, diagnoses, troubleshooting procedures, and repairs associated with CPE devices 102 and associated metadata. In some examples, this troubleshooting and repair feedback data is input into a troubleshooting and repair feedback data source 106 via a service technician. In other examples, this troubleshooting and repair feedback data is automatically collected by the troubleshooting and repair feedback data source 106 based on automatic issue identification, diagnostic, troubleshooting, and repair steps performed by CPE devices 102 and/or the TDR server 104. According to an aspect, the TDR server 104 is further configured to receive data from a service provider system 108. For example, service provider system 108 is configured with a network interface 240 that enables the service provider system to pass messages to the TDR server 104 to provide information relating to signal levels of transmissions from the server provider system headend, bandwidth levels, software update-related information, available services, customer subscription information, business rules, etc.

In some implementations, collected data is normalized based on a schema and stored in a relational database system 224 where the structured data can be stored, accessed, and analyzed, for example, using the Structured Query Language (SQL). In some implementations, extracting meaningful business intelligence from high volumes of data can be inefficient and difficult with traditional relational database systems. Accordingly, in other implementations, collected data are stored and analyzed using the Not only SQL (NoSQL) database technology (database system 224) that uses a non-relational and schema-less data model. A NoSQL database system 224 can efficiently handle storage and analysis of large varying unstructured data sets, such as the vast amount and variety of telemetry data, troubleshooting and repair feedback data, and service provider data collected by the TDR server 104. For example, a vast amount of various types of structured, unstructured, and semi-structured data can be communicated to the TDR server 104 from a vast number of CPE devices 102, troubleshooting and repair feedback data sources 106, and from the service provider system 108. Example NoSQL data models can include key-value stores (e.g., where data includes a unique identifier key and a value), document stores (e.g., for storing, retrieving, and managing semi-structured document object data), column-oriented stores (e.g., designed to store data in sections of columns of data instead of rows), and graph databases (e.g., designed for data whose relations are well represented as a graph and has elements which are interconnected). In some implementations, the database system 224 is implemented as a distributed file system, wherein a resource manager may manage access on the file system and the data analyzer 226 orchestrates execution on the storage layer. For example, a NoSQL database systems 224 not only provides storage and management of collected data, but also provides ability to perform data analytics for enabling understanding of complex data sets and deriving insights for identification, diagnosis, troubleshooting, and correction of issues.

In various implementations, the data analyzer 226 is illustrative of a machine learning system that is comprised of various supervised learning algorithms and/or machine learning APIs that use one or a combination of supervised and unsupervised learning methodologies to analyze attributes of previously identified issues, troubleshooting steps performed to correct the issues, and the outcomes of troubleshooting the issues. The data analyzer 226 is configured to detect structure of the data and to give meaning to patterns in the data. For example, the data analyzer 226 can gather insights on the attributes of a previous issue (e.g., based on telemetry data, device identifier data, user-reported data, troubleshooting and repair feedback data, service provider data, metadata) and the outcomes that occurred in relation to the effects of the issue. Example insights on attributes of an issue can include understandings of symptoms of the issue, telemetric data values associated with the issue, attributes of CPE devices 102 affected by the issue, indications of the issue, etc. Example insights on outcomes can include understandings of the effects to the performance of the CPE device 102, whether the issue is correctable, troubleshooting steps involved to correct the issue, and other business-related insights, such as a cost to correct the issue, rate of occurrence of the issue, etc.

According to an aspect, being able to derive insights (e.g., identify data patterns) on issues allows the system to observe or analyze telemetric data, CPE device identifier data, and other data, and compare the data to what the data analyzer 226 has learned is indicative of an issue for identifying the issue in CPE devices 102. Collection and analysis of various CPE devices 102 enables the system to evaluate the communal health of an operating environment 100. For example, issues that may affect a plurality of CPE devices 102 due to reasons such as location, hardware components, software issues, etc., can be identified based on detecting similar attributes or disparities in collected data. According to an aspect, the data analyzer 226 is operative or configured to use derived insights to generate or configure self-check rules for enabling the on-device self-healing engine 212 and/or the remote self-healing engine 228 to identify issues associated with a CPE device 102 based on applying self-check rules to collected data.

In various implementations, in identifying an issue associated with a CPE device 102, at least a portion of the identification can be performed remotely (i.e., at the TDR server 104). According to an example, the remote self-healing engine 228 can process data based on a configurable set of self-check rules for identifying an issue associated with one or more CPE devices 102. The remote self-healing engine 228 is illustrative of a software module, system, or device operative or configured to analyze or evaluate various data (e.g., telemetry data, troubleshooting and repair feedback data, service provider data, metadata, and other data) for one or more of: identifying a performance issue with one or more CPE devices 102, diagnosing a performance issue with one or more CPE devices, and providing troubleshooting and repair steps/instructions for resolving or repairing an identified issue to one or more CPE devices and/or other devices 112. In some examples, the remote self-healing engine 228 is operative or configured to communicate with other system components for correcting an issue (e.g., correct network settings via a control system). In analyzing data, the remote self-healing engine 228 may filter data, enrich data with additional data values, compare data, generate alerts, apply certain logic to the data, etc. As an example, the remote self-healing engine 228 may be configured to evaluate one or more self-check rules for analyzing certain telemetry data points collected from one or more CPE devices 102 and for creating an alert when certain telemetry values meet or exceed a certain threshold.

According to another aspect, deriving insights further enables the system to predict outcomes (e.g., identify issues proactively). For example, based on insights derived by the data analyzer 226, the remote self-healing engine 228 may be able to identify future potential issues before a customer call. The data analyzer 226 is operative or configured to analyze telemetry data, troubleshooting and repair feedback data provided by one or more troubleshooting and repair feedback data sources 106, and associated metadata for determining whether a data pattern exists for a particular issue. For example, the data analyzer 226 can analyze collected data for determining whether a particular issue is associated with certain attributes, such as one or a combination of: certain telemetry data, a particular type of CPE device 102 (e.g., similar type, similar model), a particular service, a certain network, a certain location, a certain node, a certain software version, certain applications, certain device configurations, etc. That is, the data analyzer 226 is operative or configured to run analytics against certain data for identifying data patterns related to attributes of issues. Accordingly, the data analyzer 226 can derive self-check rules for enabling the on-device self-healing engine 212 and/or the remote self-healing engine 228 to proactively determine whether data collected in association with a CPE device 102 corresponds with attributes of a known issue, which can be indicative of the CPE device being affected by the issue. Based on an evaluation of self-healing rules, the remote self-healing engine may determine or infer that the CPE device 102 is affected by the issue. In various implementations, the data analyzer 226 is further operative or configured to store its predictions and to fine tune and adjust its predictions over time as more data is collected and additional insights are derived.

According to another aspect, deriving insights further enables the system to determine an optimal troubleshooting plan for diagnosing, troubleshooting, and, if possible, for self-correcting a particular issue associated with a particular CPE device 102. That is, the data analyzer 226 is further operative or configured to use derived insights to generate troubleshooting steps for enabling the on-device self-healing engine 212 and/or the remote self-healing engine 228 to troubleshoot and diagnose identified issues for self-healing or self-correcting the issues. For example, the data analyzer 226 is configured to determine troubleshooting and repair steps/instructions (rules) based on a combination of: identified issues, collected telemetry data, troubleshooting and repair feedback data provided by one or more troubleshooting and repair feedback data sources 106, self-healing data provided by one or more CPE devices 102, historical troubleshooting or self-healing data associated with troubleshooting steps executed by or provided by the on-device self-healing engine 212 and/or the remote self-healing engine 228. That is, based on an analysis of collected data, the data analyzer 226 can identify a set of troubleshooting steps, which can include an evaluation of troubleshooting rules and execution of certain actions based on the evaluations, for resolving the issue. In some examples, the data analyzer 226 is operative to configure a set of troubleshooting steps based on an identified data pattern associated with resolving a particular issue (e.g., discovered via machine learning techniques). In some examples, an optimal troubleshooting plan can be determined based on a fewest number of steps, steps that do not require user-involvement, a fastest method, etc. The troubleshooting steps can be stored in the rules store 242 in associated with a particular issue or in association with certain attributes of a particular issue, and are accessed by the remote self-healing engine 228. In some examples, the troubleshooting steps are communicated to the on-device self-healing engine 212 of a CPE device 102. In some examples, some troubleshooting steps may be executed by the TDR server 104, and other troubleshooting steps may be executed by the CPE device 102.

In one example, a field technician may visit a user's home to respond to a customer call regarding an issue with a CPE device 102. Telemetry data associated with the CPE device 102 may be collected responsive to the customer call and/or during the technician's visit. Additionally, troubleshooting steps initiated by the technician and results (e.g., whether or not certain troubleshooting steps resolved the issue) can be input (e.g., by the technician) and transmitted to the TDR server 104, where the data are stored, processed, and analyzed for determining appropriate troubleshooting steps or instructions for resolving the issue. The determined appropriate troubleshooting steps or instructions for diagnosing and repairing an issue can be stored in a rules store 242 and configured as a set of troubleshooting rules for resolving the issue. In some examples, the rules store 242 is part of the database system 224.

In some examples, some troubleshooting steps may entail user involvement. For example, a troubleshooting plan for a particular issue may include a troubleshooting step of checking to see if an HDMI cable is fully plugged into the CPE device 102 and into a connected display 250. According to an aspect, such troubleshooting steps can be communicated to the CPE device 102 or to another device 112, such as to the user's mobile phone, to a speaker device, or to another CPE device 102 in the user's home, where the steps can be displayed in a graphical UI (GUI) (e.g., a guide UI, an application UI, a chat or message interface, an email) and/or played audibly through an auditory UI (e.g., provided by the CPE device, a mobile phone, another CPE device, a connected speaker device and microphone).

In various implementations, the remote self-healing engine 228 or the on-device self-healing engine 212 is operative or configured to provide a notification for display to a user, such as a notification of the issue and other relevant information (e.g., contact information, instructions). In some implementations, the remote self-healing engine 228 or the on-device self-healing engine 212 is operative or configured to determine whether user-involved troubleshooting steps can be communicated to a user via the CPE device 102 or whether the user-involved troubleshooting steps should be communicated to another device 112. For example, if an HDMI connection issue is identified, video and audio may not be communicated from the CPE device 102 to a particular display or speaker (e.g., a television connected to the CPE device via the HDMI cord). Accordingly, the remote self-healing engine 228 or the on-device self-healing engine 212 is operative or configured to determine another method to provide the user-involved troubleshooting steps to the user (e.g., via a guide UI on another CPE device 102, an application UI on a mobile phone, a chat or message interface on another device, an email, a phone call). This determination can be based in part on service provider system data (e.g., user contact information, user CPE device information, business rules) provided by the service provider system 108. In some examples, one or more troubleshooting steps or instructions can be communicated by the TDR server 104 to another device 112 for presentation to a user. In other examples, one or more troubleshooting steps or instructions can be communicated by the CPE device 102 to another device 112 to presentation to a user. The UI engine 214 is operative or configured to provide the UI (e.g., GUI, auditory UI) for presentation on a display 250 or playback via a speaker, and to receive user input or feedback via the UI.

In some implementations and as illustrated in FIG. 3, a UI 306 can be adjusted dynamically for providing troubleshooting steps 306a-n. For example, a CPE device 102a may identify an issue based on an evaluation of one or more self-check rules. Responsive to identifying the issue, the CPE device 102a may issue an alert 302 associated with the identified issue to the TDR server 104. The TDR server 104 may generate a troubleshooting plan 304 for attempting to resolve the issue based at least in part on the particular CPE device 102a and communicate one or more troubleshooting steps 306 of the troubleshooting plan to the CPE device 102a. In the illustrated example, the CPE device 102a is configured to communicate troubleshooting steps 306 to another device 112 embodied as another CPE device 102b in the user's home. For example, the troubleshooting plan 304 may include one or more user-involved troubleshooting steps to communicate to the user and the identified issue may be associated with a loss of communication between the CPE device 102a and an associated display 250a. Accordingly, the CPE device 102a may communicate a first troubleshooting step 306a to the other CPE device 102b, wherein the first troubleshooting step is a first user-involved troubleshooting instruction 308a (e.g., make sure the HDMI cable is securely plugged into the HDMI ports on the CPE device 102a and the display device 250a). The UI engine 214 of the other CPE device 102b may dynamically update the UI 306 (e.g., a guide UI) to display the first user-involved troubleshooting instruction 308a. In other examples, TDR server 104 can determine whether to provide troubleshooting instructions 308 to the affected CPE device 102a or to another CPE device 102b. In other examples, the TDR server 104 can additionally provide the troubleshooting instructions 308 directly to the other CPE device 102b.

The user may perform the first user-involved troubleshooting instruction 308a (e.g., securely plug the HDMI cable into the HDMI ports), and may provide feedback, such as an acknowledgement that the action/step was performed, which the other CPE device 102b can communicate to the CPE device 102a (or to the TDR server 104). The next troubleshooting step 306b may comprise a self-check step, such as an instruction for the on-device self-healing engine 212 to evaluate a troubleshooting rule (e.g., evaluate whether the television HDMI port is receiving a signal). Based on the evaluation result (e.g., the television HDMI port is receiving a signal, the television HDMI port is not receiving a signal), a next troubleshooting step 306c may be another user-involved troubleshooting step (e.g., check whether the HDMI cord is tightly coiled or bent), which the CPE device 102a (or the TDR server 104) may communicate to the other CPE device 102b for display to the user. Accordingly, the UI 306 can be dynamically updated to display a next user-involved troubleshooting instruction 308b to the user. According to an aspect, steps 306 of the troubleshooting plan 304 may be performed until the issue is resolved or until a determination is made that the issue cannot be self-resolved. In various implementations, the on-device self-healing engine 212 (or the remote self-healing engine 228) may be operative or configured to generate troubleshooting and repair feedback (e.g., the troubleshooting steps 306a-n performed and the results). The troubleshooting and repair feedback and any associated metadata can be communicated to the TDR server 104 via the communications interface 210. For example, this data can be used to update troubleshooting plans 304 or can be accessed by a field technician. In some examples, the field technician is enabled to reduce the amount of time spent at the user's premises to fix the issue. If an issue cannot be resolved, if a determination is made that a certain component has failed and needs to be replaced by a field technician, or if a determination is made that a CPE device 102 needs to be replaced, this information is communicated to the TDR server 104 and accessed by an appropriate person or system. For example, this information can be accessed such that a field technician can be prepared with a specific failed component prior to visiting the user's premises, thus reducing truck rolls and minimizing the technician's time on the call. Additionally, this information can help to avoid replacements of CPE devices 102 by enabling self-repairs or self-diagnoses of issues.

Figure 4A:
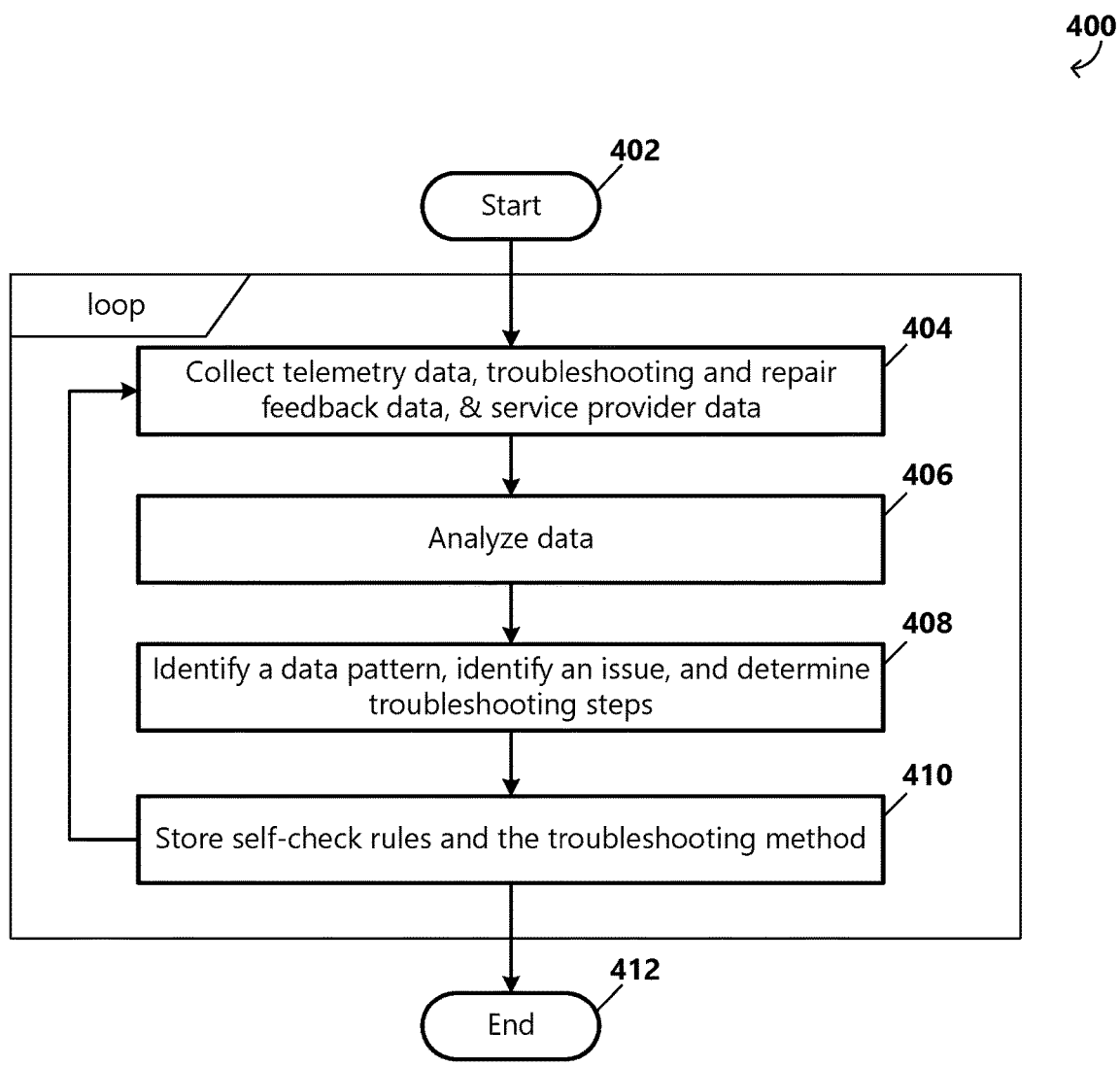
FIG. 4A is a flow diagram depicting general stages of an example process for determining troubleshooting plans for providing telematics-based device troubleshooting, self-repair, and optimization according to an embodiment according to an embodiment.

FIG. 4A is a flow diagram that depicts general stages of an example method 400 for determining troubleshooting plans 304 for providing telematics-based device troubleshooting, self-repair, and optimization according to an embodiment. The method 400 begins at START OPERATION 402, and proceeds to OPERATION 404 where the method 400 uses the TDR server 104 to collect and store telemetry data from a plurality of CPE devices 102, troubleshooting and repair feedback data from a plurality of troubleshooting and repair feedback data sources 106, service provider data from a service provider system 108, metadata, and other data.

At OPERATION 406, the method 400 uses the TDR server 104 to analyze the collected data. For example, the data analyzer 226 uses advanced analytics techniques (e.g., machine learning) for discovering insights related to correlating various telemetry data values and metadata with one or more issues (e.g., network issues, connectivity issues, overheating issues, grounding issues, software issues, hardware component issues) and for correlating data about identified issues with certain CPE devices 102 (e.g., based on device type, location, configuration, node) and/or with data about troubleshooting steps and results.

At OPERATION 408, the method 400 uses the data analyzer 226 to determine one or a plurality of self-check steps for enabling a CPE device 102 or the TDR server 104 to automatically analyze the health of the CPE device for identifying issues. Additionally, at OPERATION 408, the method 400 uses the data analyzer 226 to determine appropriate and optimized troubleshooting steps or instructions for resolving the issues.

At OPERATION 410, the determined self-check steps are stored in the rules store 242 and are configured as a set of self-check rules, and the troubleshooting steps are stored in the rules store 242 and configured as a set of troubleshooting rules for one or more issues. OPERATIONS 404-410 can be performed in a loop, wherein data are continually analyzed for learning aspects of issues for identifying issues, for determining troubleshooting plans 304 for identified issues, and for adjusting self-check rules and troubleshooting plans as more data is collected and additional insights are derived. The method 400 ends at OPERATION 412.

Figure 4B:
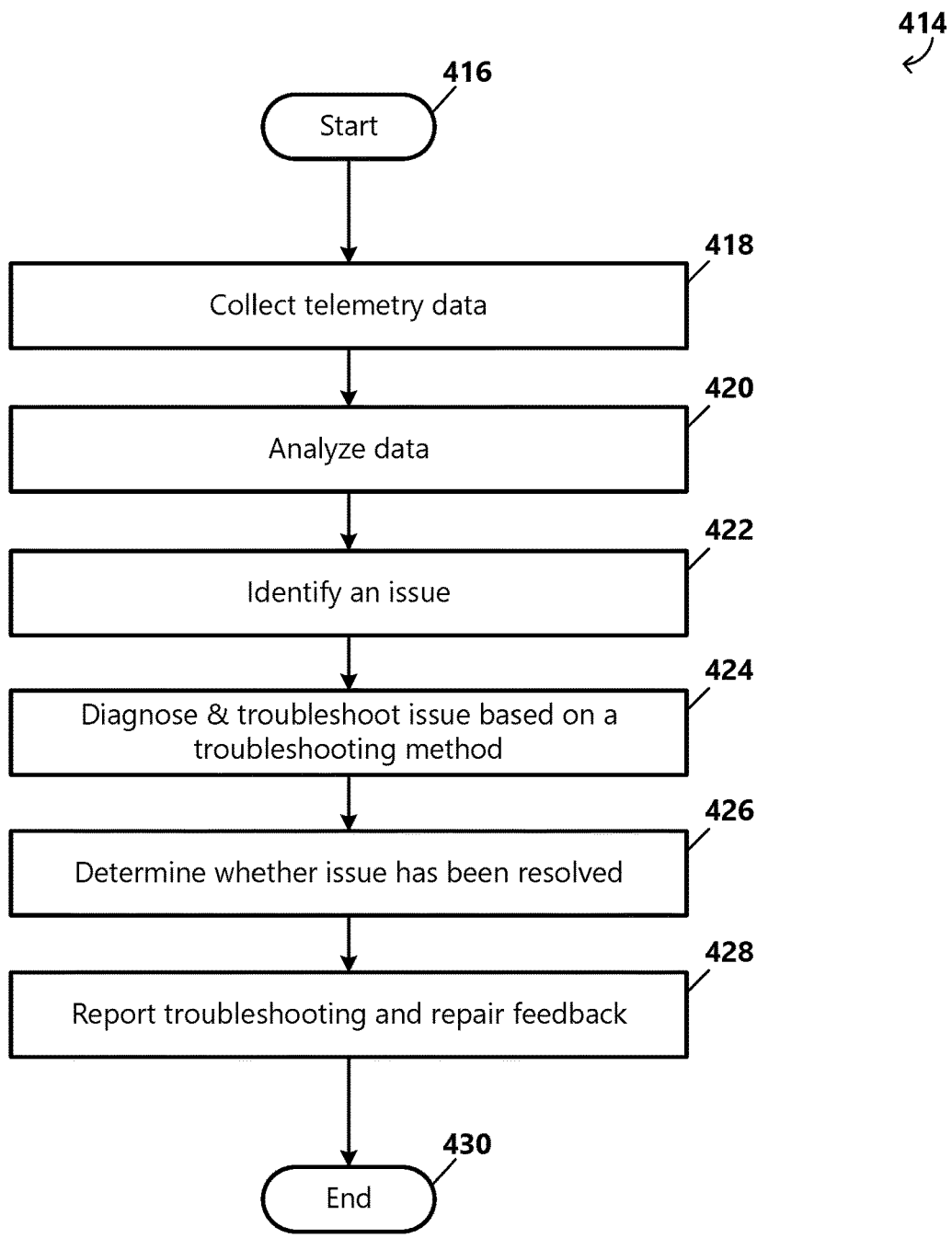
FIG. 4B is a flow diagram depicting general stages of an example process for providing telematics-based device troubleshooting, self-repair, and optimization according to an embodiment.

FIG. 4B is a flow diagram that depicts general stages of an example method 414 for telematics-based device troubleshooting, self-repair, and optimization according to an embodiment. The method 414 begins at START OPERATION 416, and proceeds to OPERATION 418 where the method 414 uses the telematics engine 206 of a CPE device 102 to collect telemetry data associated with the CPE device.

At OPERATION 420, the method 414 uses the on-device self-healing engine 212 and/or the remote self-healing engine 228 to analyze the collected data. In some examples, the method 414 uses the on-device self-healing engine 212 to evaluate a plurality of self-check rules for analyzing certain telemetry data points. When certain telemetry values meet or exceed a certain threshold, at OPERATION 422, the method 414 can use the on-device self-healing engine 212 to create an alert for communication with the TDR server 104. In other examples, the method 414 uses the on-device self-healing engine 212 or the remote self-healing engine 228 to evaluate one or more self-check rules for analyzing telemetry data and/or device identifier data for identifying an issue based on issues experienced with other CPE devices 102. For example, the remote self-healing engine 228 may, based on certain self-check rules, infer that the particular CPE device 102 may be experiencing a same issue based on the analyzed telemetry data, based on an identifying aspect of the CPE device, and/or based on certain attributes of other data collected from the CPE device.

At OPERATION 424, the method 414 uses the remote self-healing engine 228 to generate a troubleshooting plan comprised of one or more troubleshooting steps 306 for resolving an identified issue. The particular troubleshooting plan 304 can be customized based on the particular CPE device 102, the particular issue, particular telemetry data values, etc. One or more troubleshooting steps 306 of the troubleshooting plan 304 can be communicated to the on-device self-healing engine 212, and the on-device self-healing engine can execute one or more of the troubleshooting steps 306 for diagnosing and resolving the identified issue. In some examples, the remote self-healing engine 228 may execute one or more of the troubleshooting steps 306.

At OPERATION 426, the method 414 uses the on-device self-healing engine 212 or the remote self-healing engine 228 to determine whether the issue has been resolved (e.g., based on evaluating one or more troubleshooting rules). At OPERATION 428, the method 414 uses the on-device self-healing engine 212 or the remote self-healing engine 228 to provide troubleshooting and repair feedback, the feedback including information associated with whether the one or more troubleshooting steps resolved the issue. According to an aspect, the troubleshooting and repair feedback can be stored in the database system 224, and the data analyzer 226 can analyze the feedback data for deriving machine-learned insights that adjust troubleshooting steps 306 and modify how a troubleshooting plan 304 is generated. The method 414 ends at OPERATION 430.

Figure 5:
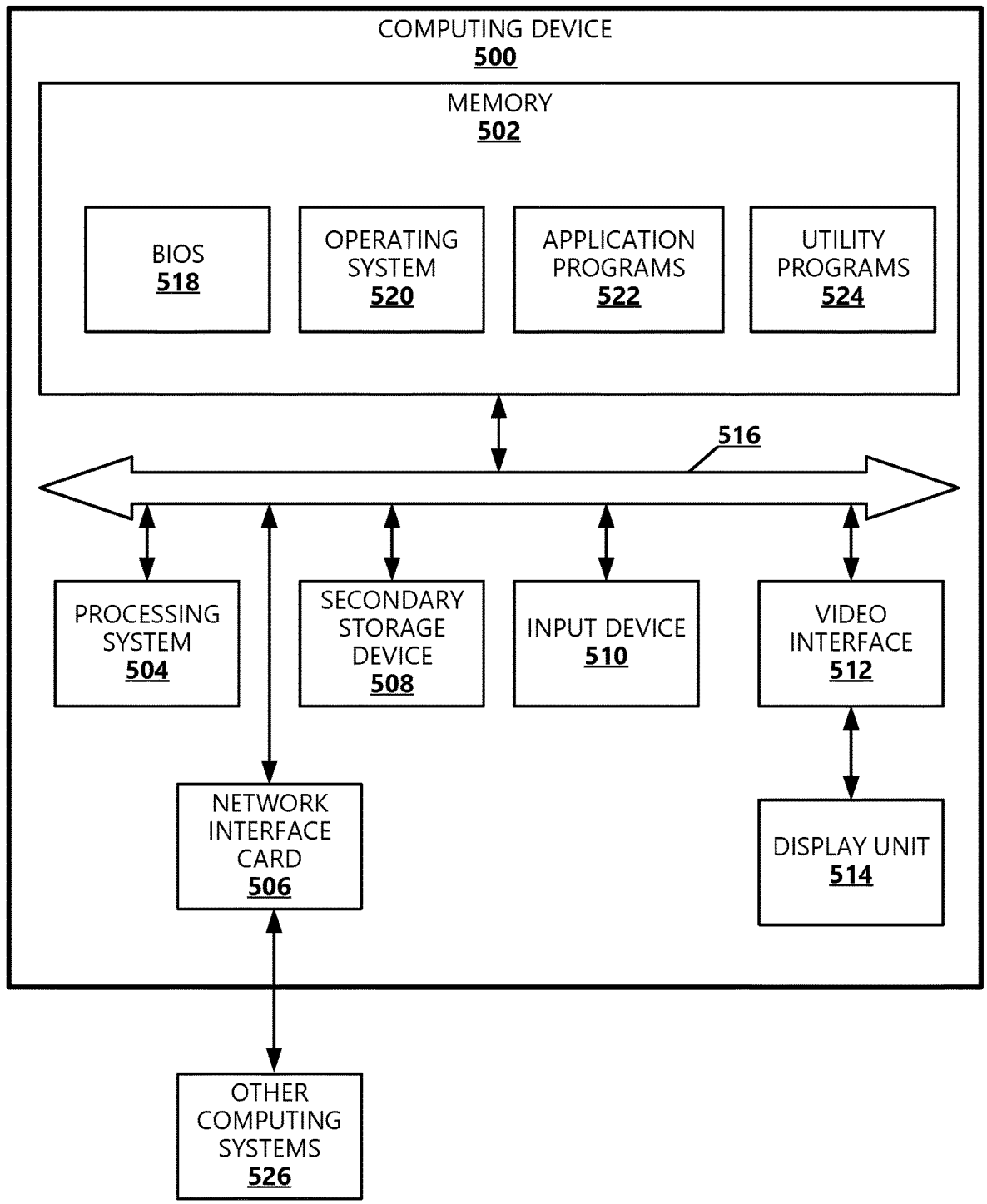
FIG. 5 is a block diagram illustrating example physical components of a computing device or system with which embodiments may be practiced.

FIG. 5 is a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide telematics-based device troubleshooting, self-repair, and optimization. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 6:
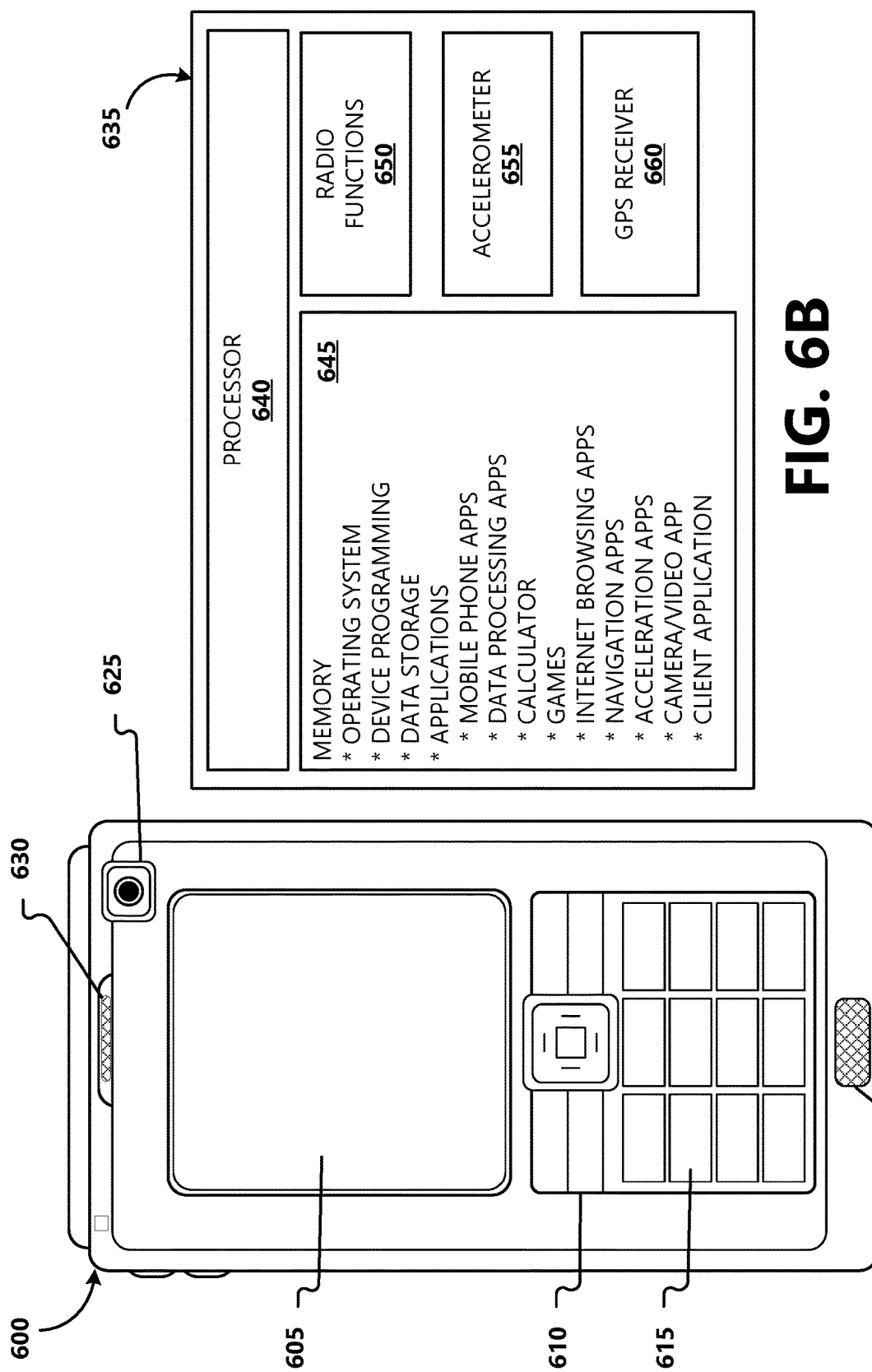
FIGS. 6A and 6B are block diagrams illustrating example physical components of a suitable mobile computing environment with which aspects of the present disclosure can be practiced.
Figure 7:
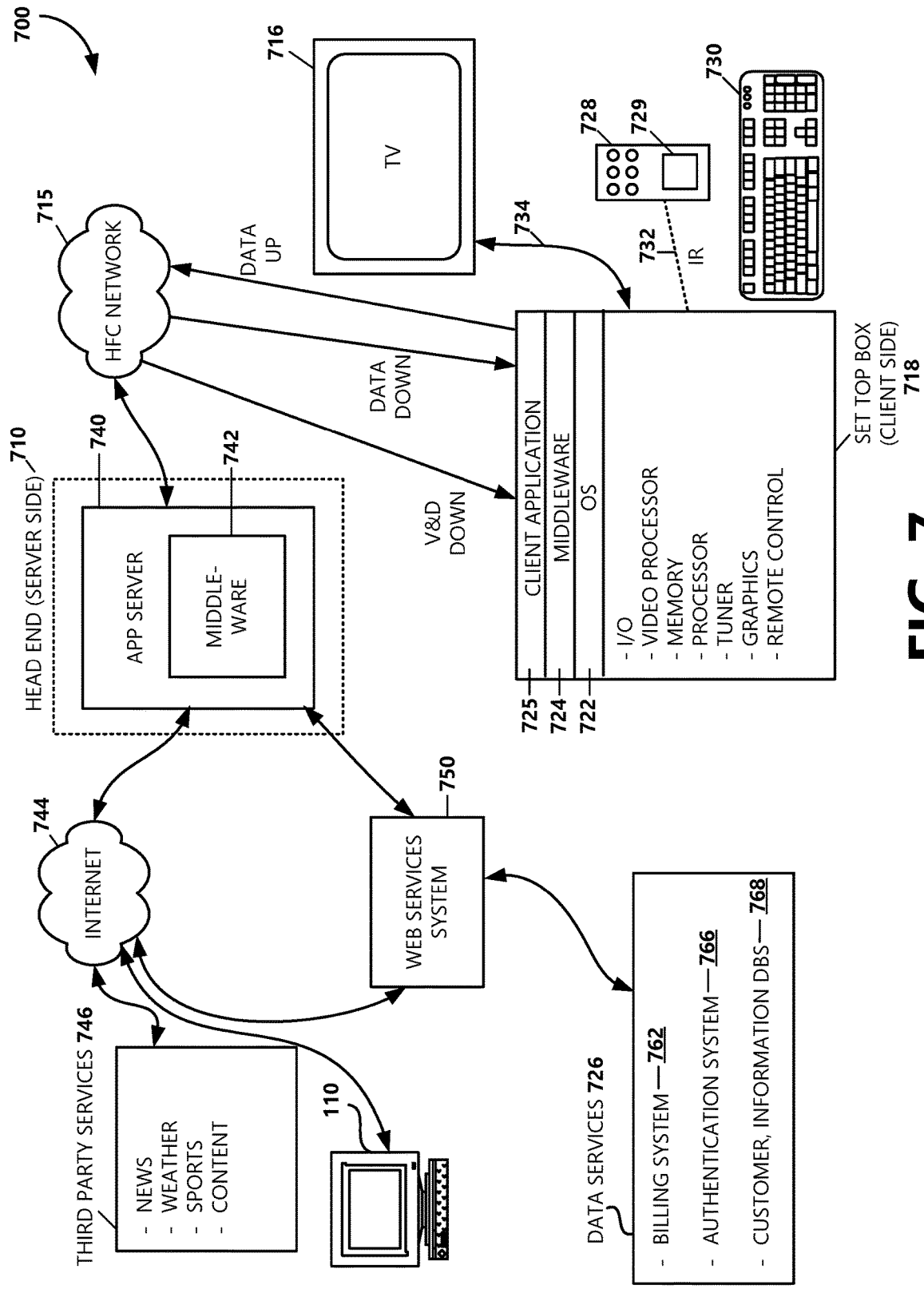
FIG. 7 is a block diagram illustrating components of a cable services system architecture providing an example operating environment according to aspects of the present disclosure.

FIGS. 6A-6B illustrate a suitable mobile computing device 600 or environment, for example, a mobile computing device or smart phone, a tablet personal computer, a laptop computer, or other user device, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

FIG. 7 is a block diagram illustrating a cable television services system 700 (hereafter referred to as "CATV") architecture providing an operating environment according to an aspect. As should be appreciated, a CATV services system 700 is but one of various types of systems that can be utilized for providing telematics-based device troubleshooting, self-repair, and optimization as described herein. Referring now to FIG. 7, digital and analog video programming, information content, and interactive television services are provided via a hybrid fiber coax (HFC) network 715 to a television set 716 for consumption by a cable television/services system customer. As is known to those skilled in the art, HFC networks 715 combine both optical fiber and coaxial cable lines. Typically, optical fiber runs from the cable head end 710 to neighborhoods of subscribers. Coaxial cable runs from the optical fiber feeders to each customer or subscriber. The functionality of the HFC network 715 allows for efficient bidirectional data flow between the set-top box 718 and the application server 740 of the aspect.

The CATV system 700 is in the form of a distributed client-server computing system for providing video and data flow across the HFC network 715 between server-side services providers (e.g., cable television/services providers) via a server-side head end 710 and a client-side customer via a set-top box (STB) 718 functionally connected to a customer receiving device, such as the television set 716. As is understood by those skilled in the art, modern CATV systems 700 can provide a variety of services across the HFC network 715 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 715 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end system 710, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 715 through a video/data downlink and data via a data downlink. The STB 718 can transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 715 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 715 to the STB 718. Operation of data transport between components of the CATV system 700, described with reference to FIG. 7, is well known to those skilled in the art.

Referring still to FIG. 7, the head end 710 of the CATV system 700 is positioned on the server side of the CATV system and includes hardware and software systems responsible for originating and managing content for distributing through the HFC network 715 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 715. As described above, the application server 740 includes a middleware layer 742 for processing and preparing data from the head end 710 of the CATV system 700 for receipt and use by the client-side STB 718. For example, the application server 740 via the middleware layer 742 can obtain supplemental content from third-party services 746 via the Internet 744 for transmitting to a customer through the HFC network 715, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 715 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 715 and the STB 718.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt.

A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer.

The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. An authentication system 766 can include information such as secure user names, subscriber profiles, subscriber IDs, and passwords utilized by customers for access to network services. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing telematics-based device troubleshooting, self-repair, and optimization, the system comprising:
at least one processor; and
a memory storage including instructions that, when executed by the at least one processor, cause the system to:
receive telemetry data from a plurality of network-connected customer premises equipment (CPE) devices;
evaluate the telemetry data for identifying an issue associated with at least one CPE device of the plurality of CPE devices;
generate a troubleshooting plan comprising a plurality of troubleshooting steps for diagnosing and resolving the issue, wherein generation of the troubleshooting plan is based on machine-learned insights;
transmit one or more of the plurality of troubleshooting steps to the at least one CPE device to cause the at least one CPE device to execute the one or more troubleshooting steps to diagnose and resolve the issue;
receive troubleshooting and repair feedback from the at least one CPE device, the feedback includes information associated with whether the one or more troubleshooting steps resolved the issue;
store data, including the telemetry data and the troubleshooting and repair feedback, in a database system;
analyze the data stored in the database system; and
based on the analysis:
predict an occurrence of the issue in association with one or more other CPE devices of the plurality of CPE devices prior to the issue occurring; and
proactively generate and transmit a modified troubleshooting plan based on the analysis to the one or more other CPE devices for execution to prevent the issue from occurring.

2. The system of claim 1, wherein in generating the troubleshooting plan, the instructions further cause the system to customize the troubleshooting plan based at least in part on the particular at least one CPE device and the issue.

3. The system of claim 1, wherein the data stored in the database system further includes service provider data from a service provider system and associated metadata, and in analyzing the data stored in the database system, the instructions further cause the system to:
  use machine-learning techniques to analyze the data for identifying a data pattern associated with attributes of the issue;
  configure one or more self-check rules based on the identified data pattern; and
  store the one or more self-check rules for use in identifying the issue.

4. The system of claim 3, wherein the service provider data includes one or a combination of:
  information about signal levels of transmissions from a headend of the server provider system;
  bandwidth levels;
  software update-related information;
  available services;
  customer subscription information; and
  business rules.

5. The system of claim 3, wherein the identified data pattern is associated with at least one of:
  particular telemetry data values;
  a type of CPE device;
  a particular service;
  a particular network;
  a location;
  a node;
  a particular software version;
  a particular hardware component;
  an application; and
  a particular device configuration.

6. The system of claim 3, wherein the instructions further cause the system to:
  use the machine-learning techniques to analyze the troubleshooting and repair feedback for deriving insights;
  adjust one or more troubleshooting steps based on the derived insights; and
  modify the troubleshooting plan for diagnosing and resolving the issue based on the derived insights to generate the modified troubleshooting plan.

7. The system of claim 6, wherein the troubleshooting and repair feedback includes information associated with troubleshooting or correcting the issue and includes one or a combination of:
  information associated with the attributes of the issue;
  information about the at least one CPE device;
  troubleshooting steps performed;
  actions taken to correct the issue; and
  results of the troubleshooting steps.

8. The system of claim 3, wherein in predicting the occurrence of the issue in association with the one or more other CPE devices, the instructions further cause the system to predict the occurrence based on an identification of corresponding attributes of the issue and the one or more other CPE devices.

9. The system of claim 3, wherein the instructions further cause the system to:
  store the one or more self-check rules for access by the at least one CPE device; and
  receive an alert indicating the issue and the telemetry data from the at least one CPE device responsive to a local identification of the issue by the at least one CPE device based on an evaluation of the one or more self-check rules.

10. The system of claim 1, wherein the instructions further cause the system to execute one or more of the plurality of troubleshooting steps of the troubleshooting plan to diagnose and resolve the issue.

11. A customer premises equipment (CPE) device comprising:
  at least one processor; and
  a memory storage including instructions that, when executed by the at least one processor, cause the CPE device to:
    collect telemetry data associated with the CPE device;
    apply one or more self-check rules to the collected telemetry data for identifying an issue associated with the CPE device, wherein one of the one or more self-check rules includes determining a status of one or more other CPE devices communicatively coupled to the CPE device, the status indicating whether the issue has been identified in association with the one or more other CPE devices;
    responsive to identifying the issue associated with the CPE device, generate and transmit an alert to a telematics device repair (TDR) server, wherein the alert includes information about the issue and about the CPE device;
    receive, from the TDR server, a troubleshooting plan comprising one or more troubleshooting steps for diagnosing and resolving the issue, wherein generation of the troubleshooting plan is based on machine-learned insights;
    execute the one or more troubleshooting steps to diagnose and resolve the issue; and
    provide, to the TDR server, troubleshooting and repair feedback, the feedback including information associated with whether the one or more troubleshooting steps resolved the issue.

12. The CPE device of claim 11, wherein the telemetry data associated with the CPE device includes information about the CPE device's connectivity to a network, signal levels, information about the functioning of hardware components, information about the functioning of software components, and application signaling information.

13. The CPE device of claim 12, wherein in determining the status of the one or more other CPE devices communicatively coupled to the CPE device, the instructions cause the CPE device to:
  request the status of the one or more other CPE devices association with the issue;
  receive an acknowledgement response from the one or more other CPE devices indicating whether the one or more other CPE devices are experiencing the same issue; and
  based on the acknowledgement response, determine whether the issue is confined to the CPE device or if the CPE device and the one or more other CPE devices are experiencing the same issue.

14. The CPE device of claim 13, wherein the one or more other CPE devices are located at a same premises as the CPE device or on a same node as the CPE device.

15. The CPE device of claim 11, wherein the one or more self-check rules are configured based on machine-learned insights learned from an analysis of telemetry data collected from a plurality of CPE devices, service provider data, troubleshooting and repair feedback, and associated metadata.

16. The CPE device of claim 11, wherein the one or more troubleshooting steps for troubleshooting the issue are configured based on machine-learned insights learned from an analysis of troubleshooting and repair feedback received from a combination of:
- other CPE devices;
- service technicians; and
- the TDR server.

17. The CPE device of claim 11, wherein the instructions further cause the CPE device to:
- determine whether to transmit at least one of the one or more troubleshooting steps of the troubleshooting plan to another device for presentation to a user, wherein the determination is based at least in part on whether the at least one of the one or more troubleshooting step can be communicated to a display device associated with the CPE device; and
- based on the determination, transmit the at least one of the one or more troubleshooting steps of the troubleshooting plan to the other device for presentation to the user.

18. A method for providing telematics-based device troubleshooting, self-repair, and optimization, the method comprising:
- receiving and storing telemetry data from a plurality of network-connected customer premises equipment (CPE) devices;
- receiving and storing server provider data from a server provider system;
- receiving and storing troubleshooting and repair feedback from a plurality of troubleshooting and repair feedback data sources;
- analyzing the collected telemetry data, server provider data, and troubleshooting and repair feedback using machine-learning techniques for identifying a data pattern associated with attributes of an issue experienced by one or more of the plurality of CPE devices;
- configuring one or more self-check rules based on the identified data pattern;
- storing the one or more self-check rules in association with the issue;
- analyzing troubleshooting and repair feedback using machine-learning techniques for determining troubleshooting steps for troubleshooting and correcting the issue;
- storing the troubleshooting steps in association with the issue;
- evaluating telemetry data collected from a CPE device from the plurality of CPE devices based on the one or more self-check rules;
- based on the evaluation, identifying the issue;
- generating a troubleshooting plan comprising one or more of the troubleshooting steps for diagnosing and resolving the issue, wherein generation of the troubleshooting plan is based on machine-learned insights;
- determining whether at least one troubleshooting step of the one or more troubleshooting steps includes involvement of a user of the CPE device;
- in response to a determination that none of the troubleshooting steps include the user's involvement, transmitting the one or more troubleshooting steps of the troubleshooting plan to the CPE device to cause the CPE device to automatically execute the one or more troubleshooting steps to diagnose and resolve the issue without the user's involvement;
- in response to a determination that the at least one troubleshooting step includes the user's involvement:
  - determining whether the at least one troubleshooting step can be communicated to the user via the CPE device; and
  - if the at least one troubleshooting step cannot be communicated to the user via the CPE device, transmitting the at least one troubleshooting step to another device through which the at least one troubleshooting step can be communicated to the user;
  - else transmitting the one or more troubleshooting steps to the CPE device;
- receiving troubleshooting and repair feedback from the CPE device, the feedback including information associated with whether the one or more troubleshooting steps resolved the issue; and
- storing the received troubleshooting and repair feedback in a database system where the troubleshooting and repair feedback is analyzed for deriving machine-learned insights that adjust the one or more troubleshooting steps and modify the troubleshooting plan.

19. The method of claim 18, wherein determining whether the at least one troubleshooting step can be communicated to the user via the CPE device further comprises determining whether the at least one troubleshooting step can be communicated to and displayed on a display device associated with the CPE device.

20. The method of claim 18, wherein if the at least one troubleshooting step cannot be communicated to the user via the CPE device, the other device to which the at least one troubleshooting step is transmitted is another CPE device of the plurality of CPE devices.

* * * * *